(12) United States Patent
Ng (10) Patent No.: US 8,714,275 B1
(45) Date of Patent: May 6, 2014

(54) TURF AERATOR

(76) Inventor: Yeow Ng, Andover, KS (US)

( * ) Notice: Subject to any disclaimer, the term of this patent is extended or adjusted under 35 U.S.C. 154(b) by 0 days.

(21) Appl. No.: 12/767,358

(22) Filed: Apr. 26, 2010

(51) Int. Cl.
*A01B 45/02* (2006.01)

(52) U.S. Cl.
USPC .............................. 172/22; 172/354

(58) Field of Classification Search
USPC .............................. 172/22; 111/92
See application file for complete search history.

(56) References Cited

U.S. PATENT DOCUMENTS

| | | | |
|---|---|---|---|
| 54,139 A | 2/1896 | Ober | |
| 567,391 A * | 9/1896 | Hopper | 254/131.5 |
| 779,984 A | 1/1905 | Allen | |
| 1,020,762 A | 3/1912 | Judson | |
| 1,893,258 A | 1/1933 | Washiburn | |
| 1,965,177 A | 7/1934 | Finkl | |
| 1,982,749 A * | 12/1934 | Leeberg | 294/50.7 |
| 2,007,826 A * | 7/1935 | Fickes | 172/18 |
| 2,079,506 A * | 5/1937 | Jenks | 172/379 |
| 2,140,266 A * | 12/1938 | Leeberg | 294/50.7 |
| 2,506,371 A * | 5/1950 | Lint | 172/19 |
| 3,011,563 A * | 12/1961 | Ceretti et al. | 172/22 |
| 2,987,018 A | 6/1962 | Vath | |
| 3,123,391 A | 3/1964 | Novak | |
| 3,180,427 A | 4/1965 | Looper, Jr. | |
| 3,210,112 A | 10/1965 | Glynn | |
| 3,788,659 A * | 1/1974 | Allen | 280/5.24 |
| 3,863,946 A * | 2/1975 | Dotson | 280/652 |
| 4,007,916 A | 2/1977 | Maples | |
| 4,204,576 A | 5/1980 | Mullet et al. | |
| 4,585,072 A | 4/1986 | Martinez | |
| 4,673,165 A | 6/1987 | Nelson et al. | |
| 4,706,582 A | 11/1987 | Keskilohko | |
| 4,791,995 A | 12/1988 | Hochlan, Jr. | |
| 4,819,735 A | 4/1989 | Puckett | |
| 4,856,759 A | 8/1989 | Ness | |
| D309,242 S | 7/1990 | Laslo | |
| 5,088,562 A | 2/1992 | Shields | |
| 5,105,578 A | 4/1992 | Fleuridas et al. | |
| 5,555,943 A | 9/1996 | Blasczyk | |
| 5,709,273 A | 1/1998 | Roth | |
| D395,807 S * | 7/1998 | Beasley | D8/7 |
| D398,203 S | 9/1998 | Naccarato et al. | |
| 5,813,471 A | 9/1998 | Ramsey | |
| D423,889 S | 5/2000 | Heffner | |
| 6,223,456 B1 | 5/2001 | Hawkins | |
| 6,257,346 B1 | 7/2001 | Schofield et al. | |
| D571,625 S * | 6/2008 | Donald et al. | D8/13 |

FOREIGN PATENT DOCUMENTS

WO    WO 9417651 A1 *   8/1994   ............... A01C 5/02

* cited by examiner

*Primary Examiner* — Thomas B Will
*Assistant Examiner* — Joel F. Mitchell
(74) *Attorney, Agent, or Firm* — Kenneth H. Jack; Davis & Jack, L.L.C.

(57) ABSTRACT

A turf aerator comprising a foot plate having an upper surface, a lower surface, a front end, a rearward end, a left side, and a right side; at least a first turf coring tine fixedly attached to and extending downwardly from the foot plate; a lever arm fixedly attached to and extending upwardly from the foot plate; and a ground contacting fulcrum fixedly attached to and extending rearwardly from the foot plate.

6 Claims, 9 Drawing Sheets

TURF AERATOR

FIELD OF THE INVENTION

This invention relates to manual and foot operable turf aerating machines and mechanisms. More particularly, this invention relates to such turf aerating machines and mechanisms which are operable for aerating tine driving via foot action and for withdrawals of such tines via hand operated lever action.

BACKGROUND OF THE INVENTION

Commonly known and configured foot actuated turf aerating machines lack versatility in their use upon and within lawn and landscaping maintenance environments. For example, lawn aerating machines which present structures for facilitating foot driven aerating tine actuation often lack any component or structure for assistance in upward withdrawals of the tines. Also, such common aerators lack versatility in use in the lawn environment, they having capabilities limited to lawn turf aeration.

The instant inventive turf aerator solves or ameliorates problems such as those discussed above by providing a turf aerating machine which, through an adaptation for alternative service as a hand truck, provides convenient and easily operable means for levered withdrawals of tines from turf.

BRIEF SUMMARY OF THE INVENTION

A first structural component of the instant inventive turf aerator preferably comprises a rigid plate having an upper surface, a lower surface, a front end, a rearward end, a left side, a right side, a medial longitudinal axis extending between the left and right sides, and a medial lateral axis extending between the front and rearward ends. In a preferred embodiment, the rigid plate preferably comprises heavy gauge steel and is substantially rectangular, the rectangle being laterally oblongated. Also, in the preferred embodiment, the rigid plate multiply functions as a pedal member for receipt of aerating tine driving foot thrusts, as a lever arm for levered extractions of such tines from soil or turf, and as a load bearing ledge or shelf for carriage of lawn maintenance items.

The instant invention preferably further comprises at least a first turf aerating tine which is fixedly attached to and extends downwardly from the lower surface of the rigid plate. Preferably, a pair of, or left and right tines, are provided, their fixed attachments preferably arranging the tines so that they reside leftwardly and rightwardly from the foot plate's longitudinal mid-line, and so that both tines reside forwardly from the foot plate's lateral mid-line. Preferably, the tines are hollow bored coring tines, their bores having upper openings overlying the upper surface of the foot plate. The edges of the lower openings of the tines' hollow bores are preferably chamfered and beveled for ease of impingement against and cutting through sod and turf surfaces.

A further structural component of the instant inventive turf aerator preferably comprises a lever arm which is fixedly attached to and extends upwardly from the rigid plate. In a preferred embodiment, the lever arm comprises an inverted "U" member whose arms' distal ends attach to the plate's upper surface at locations situated leftwardly and rightwardly from the plate's longitudinal mid-line, such attachment locations preferably being further situated rearwardly from the plate's lateral mid-line. Such rearward positioning of the arms' attachments advantageously allows the forward extension of the plate therefrom to serve as a counter-lever arm for imposing upward motion upon the tines. Where the preferred "U" configured upwardly extending lever arm is provided, the base portion of the "U" which spans between proximal ends of the U's arms provides an easily graspable and ergonomic lever handle.

A further structural component of the instant inventive turf aerator comprises a ground contacting fulcrum which is fixedly attached to and which extends rearwardly from the rigid plate. In a preferred embodiment, the ground contacting fulcrum comprises rotatably mounted left and right wheels whose axle support assemblies are fixedly attached to and are at least in part secured upon the extreme distal ends of the "U" member's left and right arms.

In use of the instant inventive turf aerator, and assuming the provision of preferred structures and arrangements of structures, as described above, a user may grasp the handle portion of the aerator's "U" configured lever arm and may tilt the aerator rearwardly about the axles of the aerator's wheels. Thereafter, the user may rollably move the aerator over the ground to a desired location for commencement of lawn turf aeration. In performance of such rolling movement, the turf aerator advantageously functions similarly with the rolling motion of a common wheeled hand truck or load carrying dolly.

Upon reaching a desired location for commencement of lawn aeration, the user may tilt the turf aerator forwardly to cause the lower ends of the tines to contact the turf, such tilting motion preferably progressing until the tines are substantially perpendicular with the turf. Thereafter, the user, while grasping the "U" member's handle, may move the lower portion and foot of one of his or her legs between the "U" member's left and right arms. Thereafter, the user may step downwardly with such extended foot upon the rigid plate's upper surface, driving the plate downwardly toward the turf, and simultaneously driving the left and right tines downwardly into the turf. While such foot driving action occurs, the upwardly extending "U" member lever arm advantageously assists the user, who at that instant stands with one foot upon the ground, to remaining in balance and standing, while allowing the user to maintain the desired perpendicular orientation of the tines. Following execution of the foot actuated downward driving steps described above, the user may step back slightly from the turf aerator and may pull rearwardly upon the handle. Such pulling action advantageously causes the "U" member handle to function as a lever arm with respect to the rearwardly extending left and right wheels which function as a fulcrum. Upon such levering, the forwardly extending rigid plate simultaneously acts as a counter-lever arm which pulls the tines upwardly and out of the turf. Performance of a multiplicity of repetitions of the steps described above effectively aerates the user's lawn surface.

Following lawn aeration in the manner described above, users commonly engage in lawn and landscape maintenance activities which involve carriage over lawn surface of heavy items such as bags of fertilizer, peat, or compost. Such bags may be conveniently placed on top of the turf aerator's rigid plate, and may be thereby carried in a manner common to usage of wheeled hand trucks and load bearing dollies.

Accordingly, it is an object of the instant invention to provide a turf aerator which provides components and structures as described above, and which arranges those components and structures in manners described above for performance of functions and for achievement of advantages, as described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
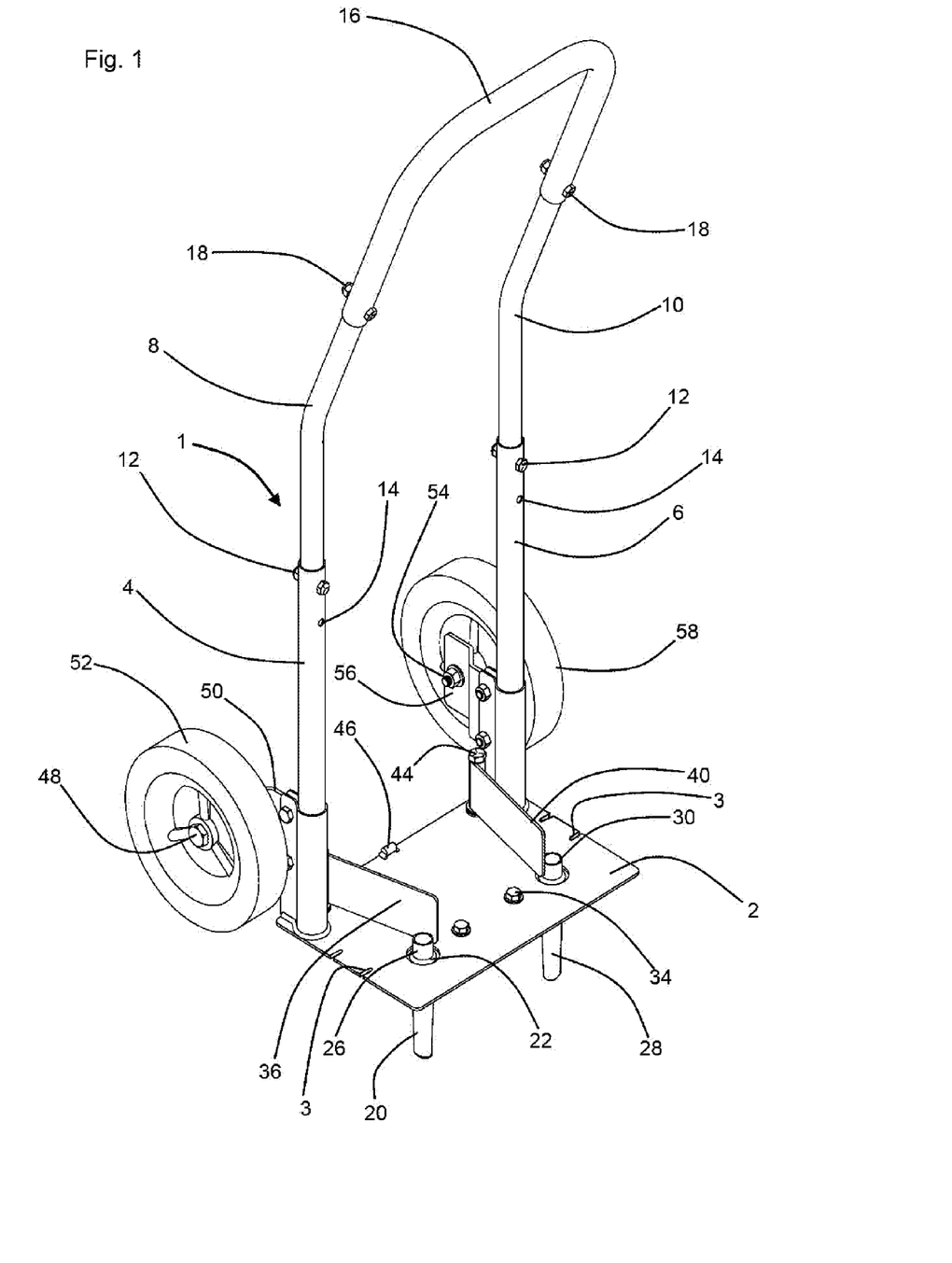
FIG. 1 is a perspective view of a preferred embodiment of the instant inventive turf aerator.
Figure 3:
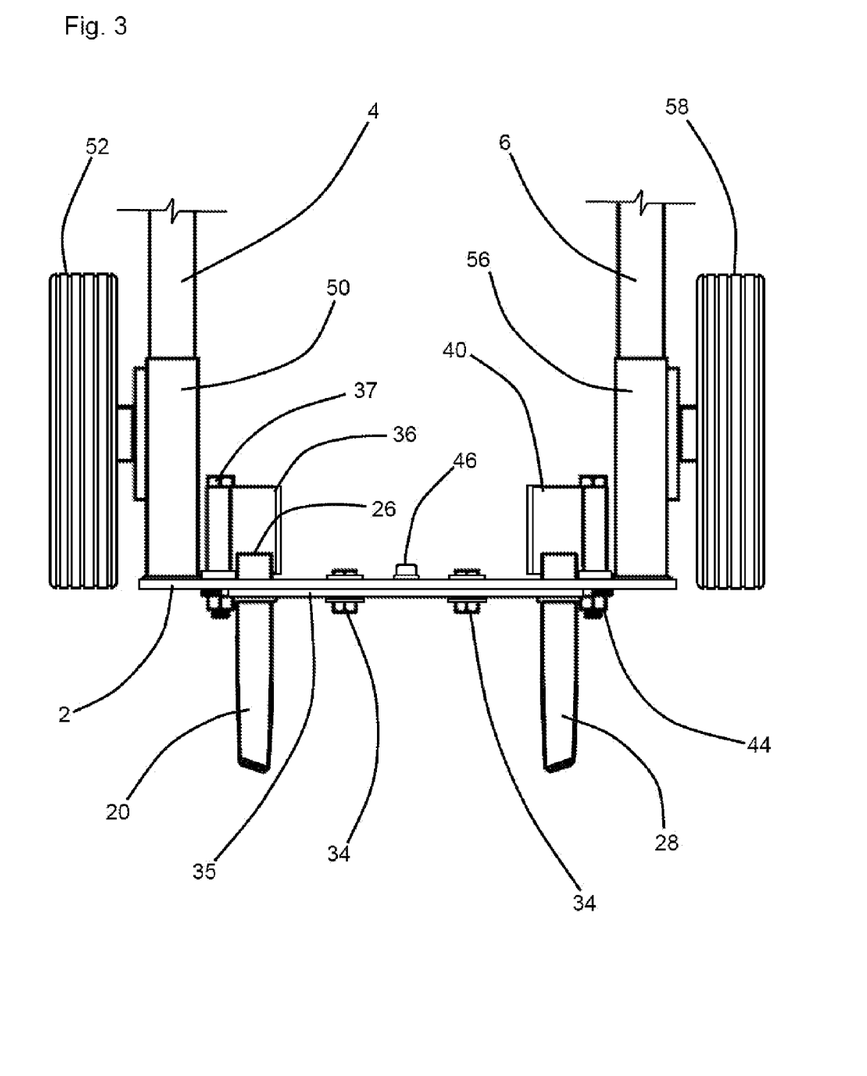
FIG. 3 is a front view of a portion of the structure depicted in FIG. 1.

Referring now to the drawings, and in particular to FIG. 1, a preferred embodiment of the instant inventive turf aerator is referred to generally by Reference Arrow 1. The turf aerator 1 preferably comprises a rigid, rectangular, and laterally oblongated foot plate 2. The foot plate 2 preferably has a pair of or left and right tine head receiving apertures 22 for receiving the upper ends or heads 30 and 26 of turf coring tines 28 and 20. While such tine pair is preferred, the scope of the invention is considered to include utilization of fewer or a greater number of tines. Referring further simultaneously to FIG. 3, the tines 28 and 20 preferably extend through and are welded upon a laterally extending the mounting plate 35. A plurality of nut and bolt combinations 34 preferably extend through apertures (not depicted within views) within plate 35, and through overlying apertures (also not depicted within views) within foot plate 2, such fasteners securely mounting the turf coring tines 28 and 20 to extend downwardly from the undersurface of the foot plate 2.

Referring simultaneously to FIGS. 1 and 3, the tine mounting plate 35, the welded connections of tines 28 and 20 thereto, the nut and bolt combinations 34, and the tine head receiving apertures 22 within the foot plate 2 constitute preferred tine mounting means. Such preferred mounting means are representative of numerous other commonly known means for mounting in a downwardly cantilevering fashion structures such as tines 28 and 20 upon plate structures such as foot plate 2.

Referring to FIG. 1, a lever arm preferably extends upwardly from and is fixedly attached to the foot plate 2. The lever arm, as is depicted, is preferably configured as an inverted "U" shaped member. The lever arm "U" member preferably comprises left and right arms 6 and 4 whose distal or lower ends are fixedly attached, preferably by welding, to the upper surface of the foot plate 2. Such fixed attachments of the arms 6 and 4 are preferably located rearwardly from the lateral mid-line of the foot plate 2 and leftwardly and rightwardly from the foot plate's longitudinal mid-line. The "U" member's left and right arms preferably comprise telescoping and adjustable extension sections 10 and 8 whose lower ends are slidably received within open upper ends of left and right arm segments 6 and 4. Eyes 14 arranged in a vertical gradient preferably extend through upper ends of the arms 6 and 4 for receipt of nut and bolt combinations 12. Through selective use and positioning of eyes 14 and nut and bolt combinations 12, the effective vertical extension of the "U" member lever over the foot plate 2 may be advantageously adjusted. A "U" shaped handle member 16 is preferably attached by nut and bolt combinations 18 to the upper ends of the telescoping extension sections 10 and 8. Such extension sections 10 and 8 preferably include approximate 20°-25° bends which ergonomically forwardly extend the handle section 16 to vertically overlie the upper foot contacting and load bearing surface of the foot plate 2.

Configuration of the lever arm component of the instant invention as the depicted "U" bracket is preferred because such configuration is capable of translating torque to the foot plate 2 at its left and right sides, because such configuration conveniently facilitates ergonomic grasping by a user's left and right hands or by a single hand, because the "U" configuration conveniently defines a foot and lower leg insertion space between arms 6 and 4, and because such configuration symbiotically helps to stabilize a user during potentially awkward and imbalancing use of the turf aerator.

Referring further to FIG. 1, a ground contacting fulcrum member is preferably fixedly attached to or is mechanically associated with the foot plate 2, such ground contacting fulcrum member preferably extending rearwardly therefrom. While the ground contacting fulcrum member may suitably comprise variously configured rearwardly extending members such as curved plates, bars, and the like, the ground contacting fulcrum member preferably comprises, as is depicted, left and right wheels 58 and 52. Such wheels are preferably mounted upon the foot plate 2 by means of axle support brackets 56 and 50 which mount securely to the lower or distal ends of the "U" member's left and right arms 6 and 4, and which support left and right axles 54 and 48. The wheeled fulcrums 58 and 52 advantageously dually function for assistance in tine levering and for rolling ground transport.

Figure 2:
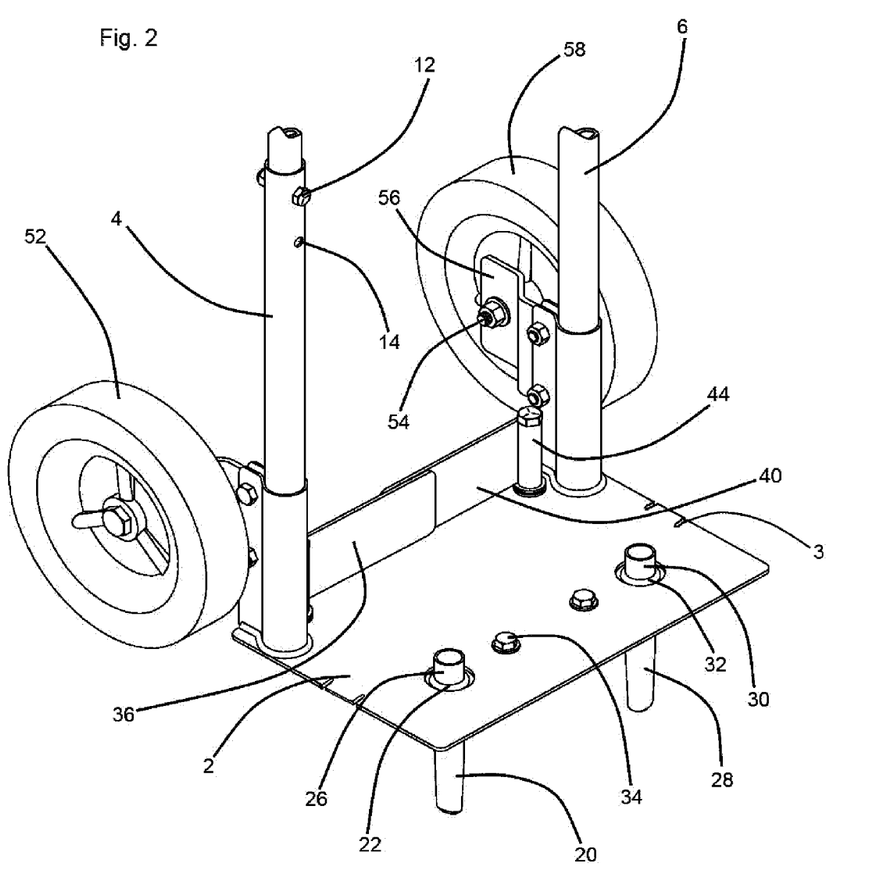
FIG. 2 is a magnified view of a portion of the structure depicted in FIG. 1.

Referring simultaneously to FIGS. 1-3, the instant inventive turf aerator 1 preferably further comprises left and right deflector plates 40 and 36 which are pivotally mounted upon the foot plate 2 by pivot posts 44 and 37. Such posts are representative of other suitably used and commonly known pivotal mounting means. Upon counter-clockwise pivoting of deflector plate 40 about pivot post 44, and upon clockwise pivoting of deflector plate 36 about pivot post 37, the distal ends of such deflector plates 40 and 36 advantageously stop at and are prevented from hyper-pivoting beyond the open upper ends 30 and 26 of the turf coring tines 28 and 20. Upon stopping their counter-clockwise and clockwise pivoting motions at the angular locations depicted in FIG. 1, the deflector plates 40 and 36 become advantageously positioned for directing dirt emanating from the upper ends 30 and 26 of the tines 28 and 20 to leftwardly and rightwardly fall from the left and right sides of the foot plate 2 rather than undesirably accumulating upon the centrally located foot contact surface area of the foot plate 2.

Figure 8:
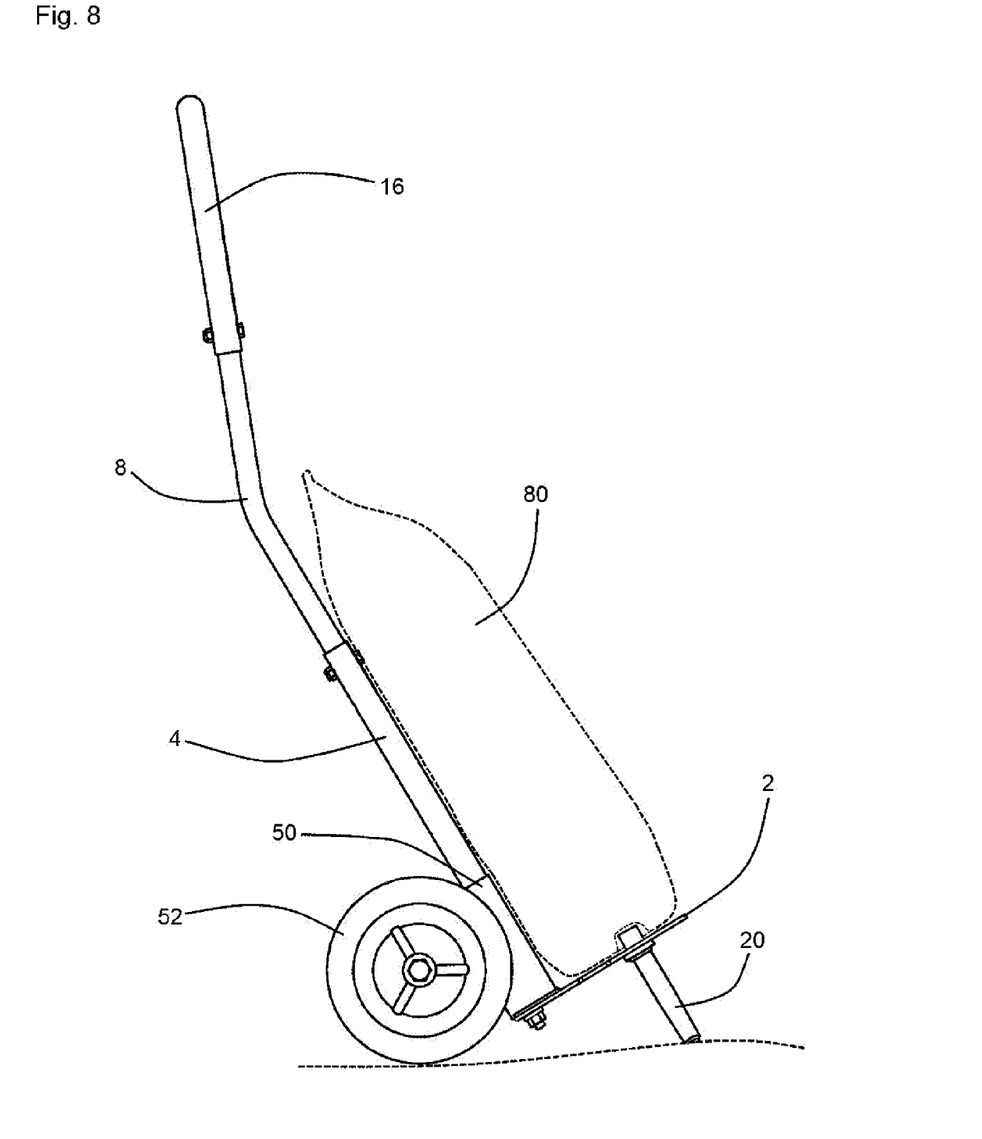
FIG. 8 demonstrates utilization of the instant inventive turf aerator as a hand truck or wheeled dolly.

Referring further simultaneously to FIGS. 1-3, a rearwardly positioned pivot stop 46 is preferably fixedly welded upon and extends upwardly from the upper surface of the foot plate 2. According to the function of pivot stop 46, while the turf aerator is not in use for lawn turf aeration, a user may advantageously pivot deflector plate 40 clockwise about pivot post 44 until the rearward or rightward surface of deflector plate 40 contacts and is stopped from rearwardly hyper-pivoting beyond pivot stop 46. Thereafter, such user may similarly pivot deflector plate 36 counter-clockwise about pivot post 37 until the leftward or rearward surface of deflector plate 36 overlaps and is stopped from rearward hyper-pivoting by the forward or leftward surface of deflector plate 40, as depicted in FIG. 2. In the configuration of FIG. 2, the deflector plates 40 and 36 advantageously function as a wall or stop flange for preventing objects carried upon the upper load bearing surface of the foot plate 2 from sliding rearwardly beyond the rearward edge of the foot plate 2. Referring further simultaneously to FIG. 8, such retained object may comprise the lower end of a fertilizer bag 80 which may be conveniently carried upon the upper load bearing surface of foot plate 2 in the manner of hand truck.

Figure 4:
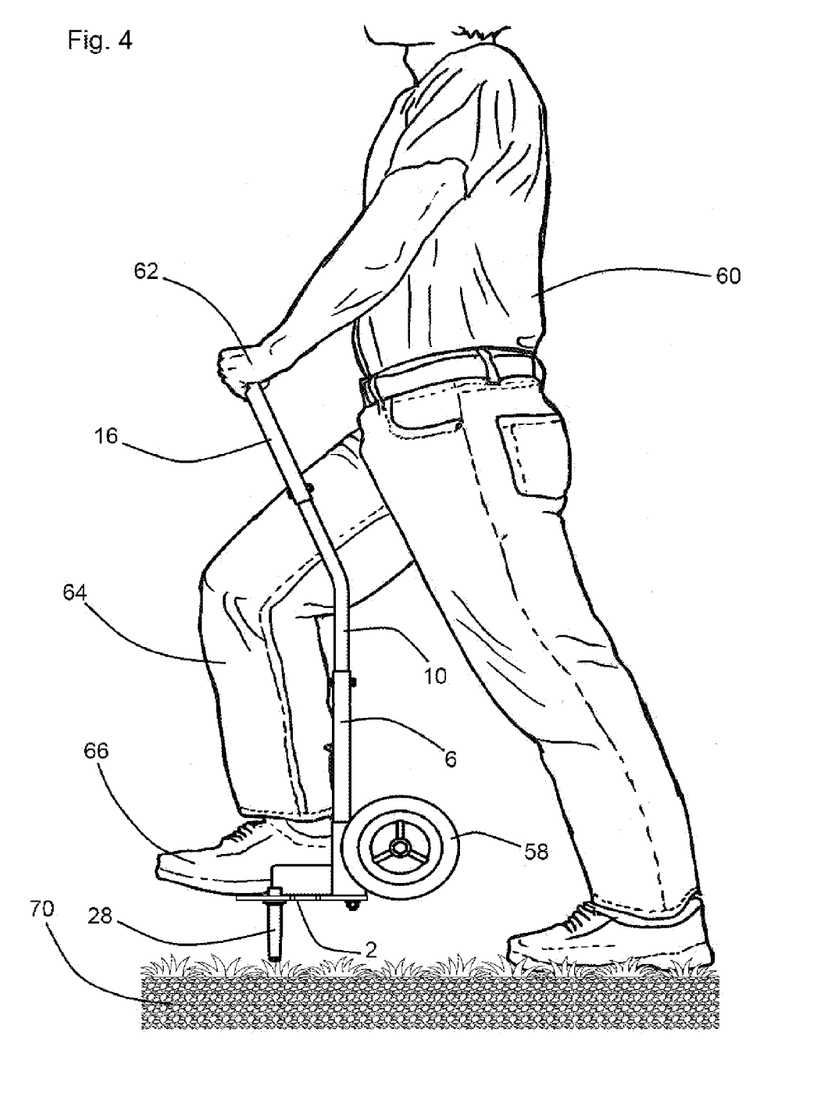
FIG. 4 demonstrates an initial usage step of the instant inventive turf aerator.

Referring simultaneously to FIGS. 1 and 4, in use of the instant inventive turf aerator 1 for lawn aeration, the turf aerator is preferably configured as depicted in FIG. 1 with deflector plates 40 and 36 respectively pivoted counter-clockwise and clockwise in stopping contact with the open upper ends 30 and 26 of coring tines 28 and 20. Upon so configuring the aerator 1, a user 60 may grasp handle 16 with left and/or right hands 62 and may extend his lower leg 64 and foot 66 into the leg and foot receiving space between the arms of the "U" member lever. Thereafter, the user 60 may firmly place the sole of his foot 66 against the upper load bearing surface of plate 2 for commencement of a downward thrusting and stepping motion. During such motion, the heads of the tine attaching bolts 34 advantageously frictionally contact the sole of the user's shoe for prevention of any undesirable slippage of the shoe over the load bearing surface of the foot plate 2. Accordingly, the nut and bolt combinations 34 advantageously dually function as a component of the instant invention's tine attaching means and as a foot slippage prevention means.

Figure 5:
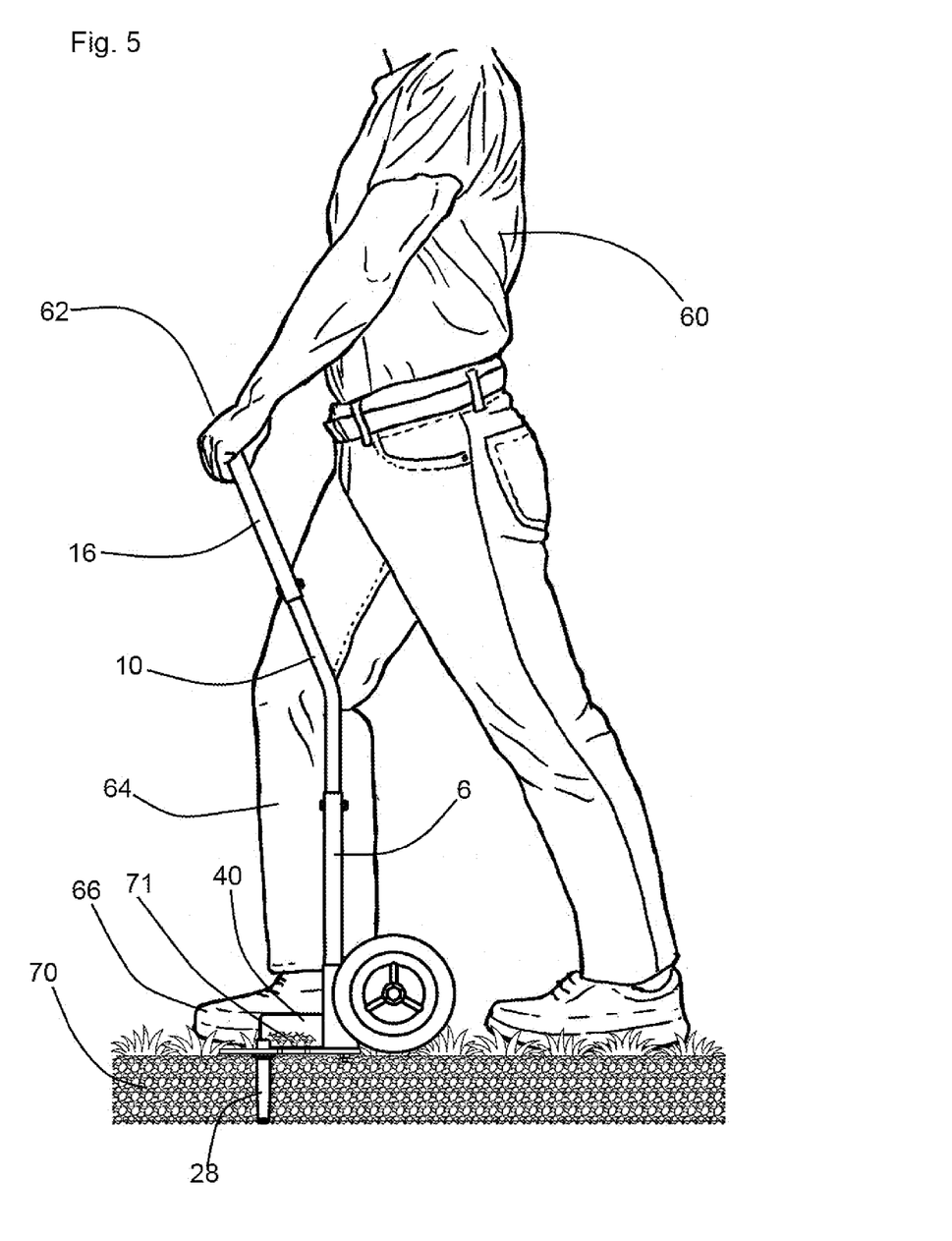
FIG. 5 demonstrates a subsequent usage step.

Referring simultaneously to FIGS. 1, 4 and 5, the user 60 may subsequently transfer his or her weight from his rearwardly placed left leg to his forwardly placed right leg, transferring the majority of his weight from the soil and turf 70 to the foot plate 2, such weight transfer driving tines 28 and 20 downwardly. Upon such downward driving of tines 20 and 28, a portion of the soil 71 typically emits upwardly from the open upper ends 30 and 26 of the tines 20 and 28 to fall upon the upper surfaces of the foot plate 2. Upon such emission of soil 71, deflector plates 40 and 36 advantageously prevent the soil 71 from scattering over the centrally located foot contact surfaces of the foot plate 2.

Referring further simultaneously to FIGS. 1, 4 and 5, it may be noted that while the user 60 moves from the position depicted in FIG. 4 to the position depicted in FIG. 5, transfer and shifting of weight and body positions may undesirably cause the user 60 to lose or compromise his or her standing balance. However, upon execution of such weight transferring motions, stabilizing left and right ground contact is extended from the "U" member's left and right arms 6 and 4 downwardly into the ground 70 via tines 28 and 20. Such "U" member ground contact advantageously assists in stabilizing the user 60 during the execution of such potentially imbalancing motions. Accordingly, the "U" configured lever arm of the aerator advantageously multiply functions as a tine extracting lever, as is further explained below, for stabilizing the body of a user 60 during turf aerating use, and as shown in FIG. 8, as the spine of a hand truck.

Figure 6:
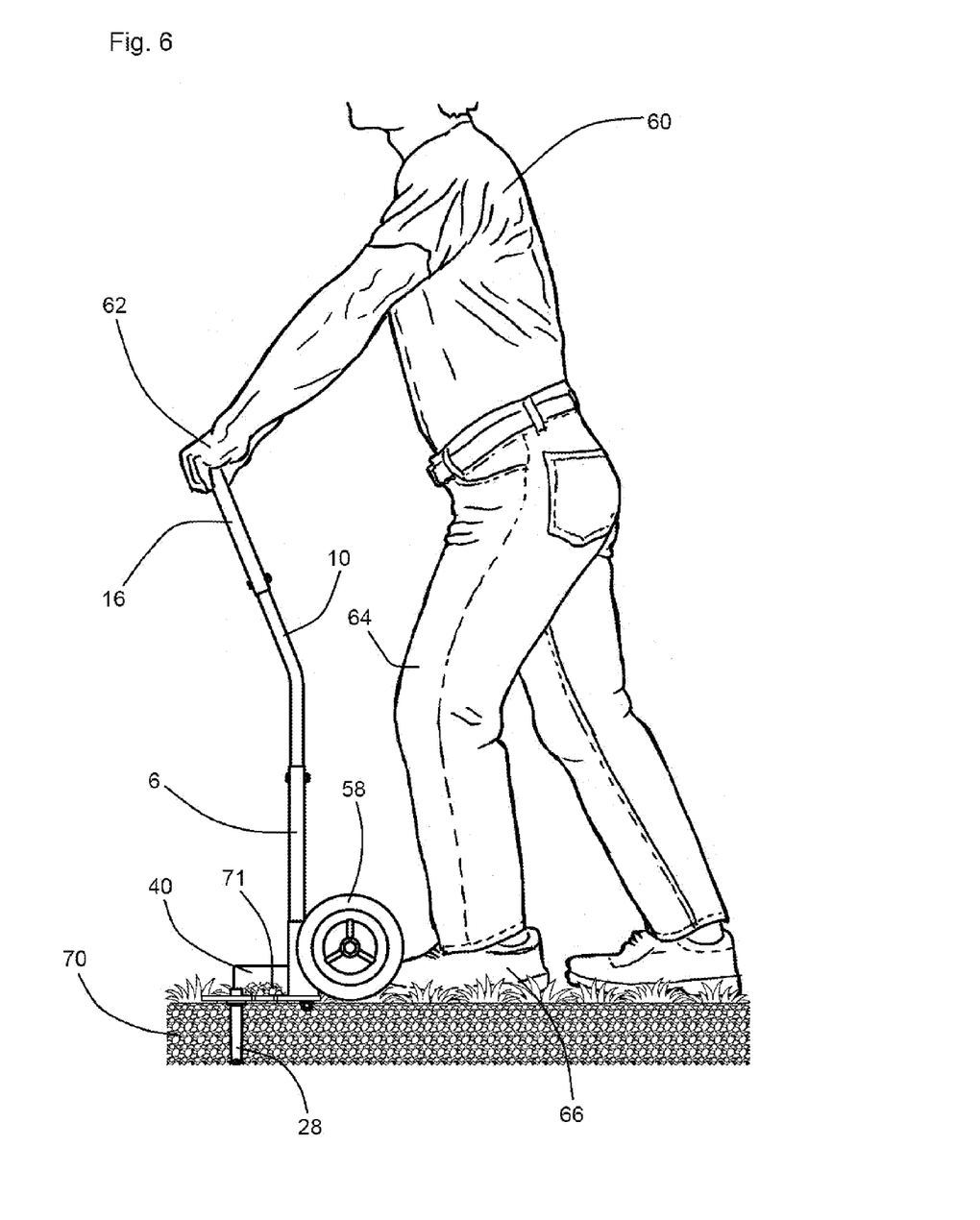
FIG. 6 demonstrates a further subsequent usage step.

Referring simultaneously to FIGS. 5 and 6, the user 60 may subsequently step rearwardly from the position depicted in FIG. 5 to the position depicted in FIG. 6 while maintaining grasping contact of hands 62 with handle 16. Thereafter, referring further to FIG. 7, the user may pull rearwardly upon the "U" member's left and right arms 6 and 4 via handle 16, causing the wheels 58 and 52 to function as a fulcrum for pulling the tines 28 and 20 upwardly and out of the soil and turf 70 from their inserted positions depicted in FIG. 6 to their extracted positions depicted in FIG. 7. Upon such rearward levering tine extracting motion, turf aerating openings 73 are advantageously created within the turf and soil 70, while emitted dirt 71 falls leftwardly and rightwardly from foot plate 2 onto the ground. Continuously and cyclic repetitions of the turf aerating usage steps depicted in FIGS. 4-7 advantageously aerates the user's lawn.

Figure 7:
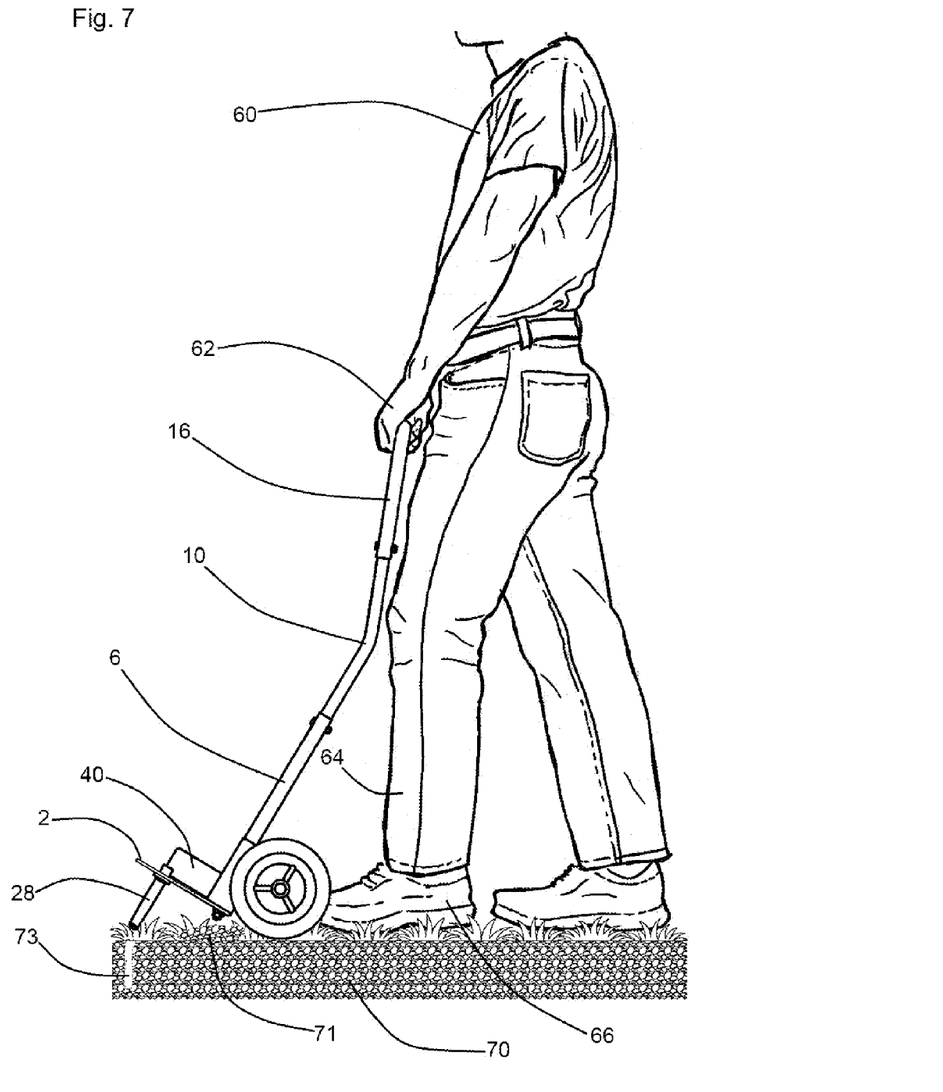
FIG. 7 demonstrates a further subsequent usage step.
Figure 9:
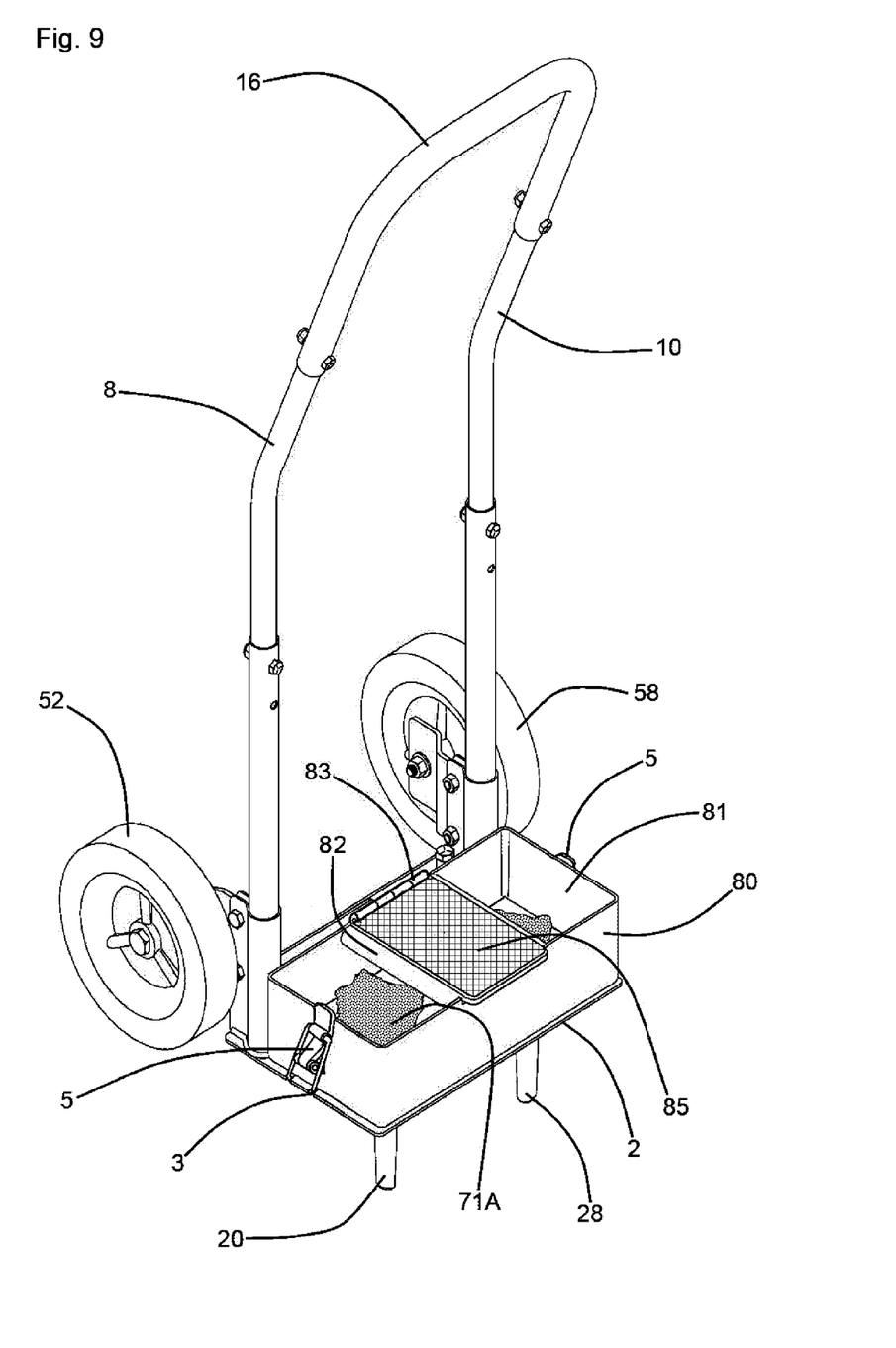
FIG. 9 re-depicts the turf aerator of FIG. 1, the view showing the aerator equipped with a detachable dirt receptacle.

Referring to FIGS. 2, 7, and 9, in the event that the user 60 finds the emissions of dirt 71 lying upon and over the lawn unsightly and unacceptable, a hollow upwardly opening dirt receptacle or tray 80 may be provided. In order to install the dirt receptacle 80 in the configuration indicated in FIG. 9, the left and right deflector plates 40 and 36 must initially be pivoted rearwardly to their stop flange configuration as indicated in FIG. 2. The floor of the dirt receptacle 80 preferably has left and right apertures (not depicted within view) which are closely fitted for receipt of the heads 30 and 26 of tines 28 and 22. Such left and right apertures within the floor of the dirt receptacle 80 advantageously dually function to allow passage of the emitted dirt 71 into the interior 81 of the dirt receptacle 80 and for prevention of any lateral or longitudinal sliding motion of the dirt receptacle 80 over the upper load bearing surface of the foot plate 2. In a preferred embodiment of the dirt receptacle 80, the lower surface of its floor preferably presents a concavities or apertures (not depicted within views) which are fitted for upward receipt of the foot friction assisting bolt heads 34, the concavities or apertures allowing the remaining portions of the lower surface of the floor to rest in flush and abutting contact with the upper surface of the foot plate 2.

While the heads 30 and 26 of the tines 28 and 20 prevent any lateral or longitudinal motion of the dirt receptacle 80, left and right over center latches 5 are preferably provided for preventing vertical movement or rocking motion of the dirt receptacle 80 over the foot plate 2. The pivot loops of the left and right over center latches 5 advantageously are received by and engage with slots 3 which are preferably provided within the lateral edges of the foot plate 2. The over center latches 5 in combination with the floor aperture's receipt of tine heads 30 and 26 constitute preferred means for removably mounting the dirt receptacle upon the foot plate. Notwithstanding, other commonly known removable mounting means may be suitably utilized.

A bridge 82 having a friction enhancing upper surface 85 preferably spans between the rearward and forward walls of the dirt receptacle 80, such bridge 82 conveniently providing a foot driving contact surface for lawn aerating use in the manner depicted in FIGS. 4-7. Upon filling of the interior 81 of the dirt receptacle 80, a user may leftwardly and rightwardly deflect the upwardly extending contact tabs of the over center latches 5, causing their loops to disengage from slots 3. Thereafter, the user may remove the dirt receptacle 80, and may dump the collected dirt emissions 71A out of the dirt receptacle 80 at an acceptable location. Thereafter, the dirt receptacle 80 may be reinstalled in the configuration depicted in FIG. 9 for continued lawn aerating use.

The bridge 82 is preferably attached to the dirt receptacle 80 by means of a hinge 83 so that prior to dumping of dirt emissions 71A, the bridge 82 may be pivoted rearwardly, and upon completion of the dumping of the dirt, the bridge 82 may be counter-pivoted for recommencement of foot stepping contact.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A turf aerator comprising:
   (a) a foot plate having an upper surface, a lower surface, a front end, a rearward end, a left side, and a right side;
   (b) a pair of tubular tines fixedly attached to and extending downwardly from the foot plate, each of the tubular tines having a dirt output end protruding upwardly from the foot plate's upper surface, the tubular tines' upwardly protruding dirt output ends comprising a first pair of pivot stops;
   (c) a lever arm fixedly attached to and extending upwardly from the foot plate;
   (d) a ground contacting fulcrum fixedly attached to and extending rearwardly from the foot plate; and
   (e) left and right dirt deflector plates and pivotal mounting means, each deflector plate among the left and right deflector plates having a lower edge, a proximal end, and a distal end, the pivotal mounting means interconnecting the proximal ends of the left and right deflector plates and the foot plate, the pivotal mounting means facilitating pivoting movements of the left and right deflector plates between dirt deflecting positions and slide stopping positions, the dirt deflector plates' distal ends being positioned between and stopping against the tubular tines' upwardly protruding dirt output ends upon the pivoting movements to the dirt deflecting positions, and the dirt deflector plates' lower edges extending along the foot plate's rearward end upon the pivoting movements to the slide stopping positions.

2. The turf aerator of claim 1 further comprising a second pair of pivot stops connected operatively to the foot plate, the second pair of pivot stops being adapted for preventing hyper-pivoting movements of the left and right dirt deflector plates beyond their dirt deflecting and slide stopping positions.

3. The turf aerator of claim 1 further comprising a dirt receptacle and removable mounting means, the removable mounting means positioning the dirt receptacle over the foot plate's upper surface.

4. The turf aerator of claim 3 wherein the dirt receptacle has an apertured floor, and wherein the removable mounting means further positions said apertures over the tubular tines' upwardly protruding dirt output ends.

5. The turf aerator of claim 4 wherein the dirt receptacle comprises an upper foot pad.

6. The turf aerator of claim 5 wherein the removable mounting means comprises a pair of over center latches.

* * * * *